(12) United States Patent
Pakhchyan et al.

(10) Patent No.: US 8,305,342 B2
(45) Date of Patent: Nov. 6, 2012

(54) PLASMA ADDRESSED MICRO-MIRROR DISPLAY

(75) Inventors: Edward Pakhchyan, Glendale, CA (US); Haik Mesropian, Glendale, CA (US); Syuzi Pakhchyan, Glendale, CA (US)

(73) Assignee: Edward Pakhchyan, Glendale, CA (US)

( * ) Notice: Subject to any disclaimer, the term of this patent is extended or adjusted under 35 U.S.C. 154(b) by 944 days.

(21) Appl. No.: 12/079,527

(22) Filed: Mar. 27, 2008

(65) Prior Publication Data

US 2009/0243975 A1 Oct. 1, 2009

(51) Int. Cl.
*G09G 3/34* (2006.01)
(52) U.S. Cl. ........................ 345/108; 345/206
(58) Field of Classification Search .............. 345/60–72, 345/108–111; 315/169.4; 313/146; 365/116
See application file for complete search history.

(56) References Cited

U.S. PATENT DOCUMENTS

| | | | |
|---|---|---|---|
| 3,262,010 A | 7/1966 | Kazan | |
| 4,896,149 A | 1/1990 | Buzak et al. | |
| 5,402,145 A | 3/1995 | Disanto et al. | |
| 5,519,520 A | 5/1996 | Stoller | |
| 5,914,760 A | 6/1999 | Daiku | |
| 6,031,656 A * | 2/2000 | Little et al. | 359/293 |
| 6,034,810 A | 3/2000 | Robinson et al. | |
| 6,038,058 A * | 3/2000 | Robinson et al. | 359/293 |
| 6,323,834 B1 * | 11/2001 | Colgan et al. | 345/84 |
| 6,985,278 B2 * | 1/2006 | Chu et al. | 359/291 |
| 6,987,601 B2 * | 1/2006 | Kaeriyama | 359/295 |
| 7,405,860 B2 * | 7/2008 | Huibers et al. | 359/290 |
| 7,944,599 B2 * | 5/2011 | Chui et al. | 359/290 |
| 2002/0000959 A1 * | 1/2002 | Colgan et al. | 345/84 |
| 2002/0061159 A1 * | 5/2002 | Dahmani et al. | 385/18 |
| 2003/0227449 A1 * | 12/2003 | Takeuchi et al. | 345/204 |
| 2004/0004592 A1 * | 1/2004 | Ikeda et al. | 345/85 |
| 2005/0180166 A1 * | 8/2005 | Hara et al. | 362/606 |
| 2006/0050028 A1 * | 3/2006 | Pasch et al. | 345/76 |
| 2006/0077149 A1 * | 4/2006 | Gally et al. | 345/85 |

\* cited by examiner

*Primary Examiner* — Jeff Piziali (57) ABSTRACT

A gas discharge addressed display comprising a matrix of micro-mechanical picture elements with optical properties.

21 Claims, 8 Drawing Sheets

PLASMA ADDRESSED MICRO-MIRROR DISPLAY

BACKGROUND OF THE INVENTION

1. Field of the Invention

The present invention relates to display panels and concerns matrix addressing of displays with micro-mechanical light modulators. More particularly, the invention concerns matrix addressing of electrostatic force actuated micro-mirror displays utilizing low pressure gas discharge.

2. Discussion of the Prior Art

Flat panel displays comprise an array of picture elements that generate or modulate light to provide an image. To supply data to individual picture elements an addressing structure is employed comprising row and column electrodes and an electronic switch for each picture element. Currently thin film transistors are used as an electronic switch in liquid crystal flat panel displays and gas discharge is employed for addressing in plasma displays. Gas discharge addressing also has been proposed for liquid crystal and electro-luminescent displays.

U.S. Pat. No. 4,896,149 issued to Buzak et al., describes an addressing structure using an ionizable gaseous medium to address data storage elements defined by overlapping areas of multiple column electrodes on a first substrate and multiple channels on a second substrate. A layer of dielectric material separates the first and second substrates. Each of the channels of the Buzak et al. structure includes a reference electrode and a row electrode. The reference electrode is set at ground potential and the row electrode receives negative-going DC pulse signals to selectively effect ionization of the gas contained within the channels.

U.S. Pat. No. 5,519,520 issued to Stoller describes a matrix-type flat panel display in which an AC plasma gas discharge system uses spatial modulation to control the grayscale of a liquid crystal layer. The liquid crystal medium is one which is operable in an on-off (bi-level) mode where the total area of saturation is directly determined by the spatial area charged by the gas discharge contiguous or adjacent thereto. A charge storage surface, such as a dielectric layer between a transparent electrode array, the LC medium and the gas medium stores a charge which is caused to spread in proportion to the amplitude of conjoint voltages at selected matrix cross-point. The charge spread area establishes a spatial or area size of the spot where the liquid crystal material changes state thereby providing spatial gray level of light transmission at the selected matrix cross-points.

As will be discussed in greater detail in the paragraphs which follow, the present invention, which is clearly distinguishable from the prior art, is uniquely directed to matrix addressing for displays based on micro-mechanical actuators with optical properties that modulate light.

SUMMARY OF THE INVENTION

It is an object of the present invention to provide a gas discharge addressed display panel with picture elements comprised of micro-mechanical light modulators. In one form of the invention this object is achieved by providing a plurality of first and second addressing electrodes and a plurality of picture elements on a substrate. Each picture element comprises a micro-mechanical actuator with optical properties and an actuation electrode. Each actuation electrode forms a capacitor with selected ones of first addressing electrodes and forms an arc gap operating in a low pressure discharge gas with selected ones of second addressing electrodes.

Another object of the present invention is to provide an addressing structure for a display panel with micro-mechanical picture elements. This object is achieved by providing a plurality of first and second addressing electrodes and a plurality of picture element electrodes on a substrate. Wherein each picture element electrode forms a capacitor with selected ones of first addressing electrodes and forms an arc gap operating in a low pressure discharge gas with selected ones of second addressing electrodes and provides a voltage potential to selected ones of micro-mechanical picture elements.

Another object of the present invention is to provide an electronic circuit for addressing a micro-mechanical picture element. This object is achieved by providing in series connected electronic circuit comprising of a first addressing electrode, a capacitor, an arc gap operating in a low pressure discharge gas and second addressing electrode. Wherein the equivalent circuit operates as voltage controlled self terminating current switch and provides a voltage potential to a micro-mechanical picture element.

The foregoing as well as other objects of the invention will be achieved by the novel display addressing structures and methods illustrated in the accompanying drawings and described in the specification that follows.

DESCRIPTION OF THE INVENTION

Figure 1:
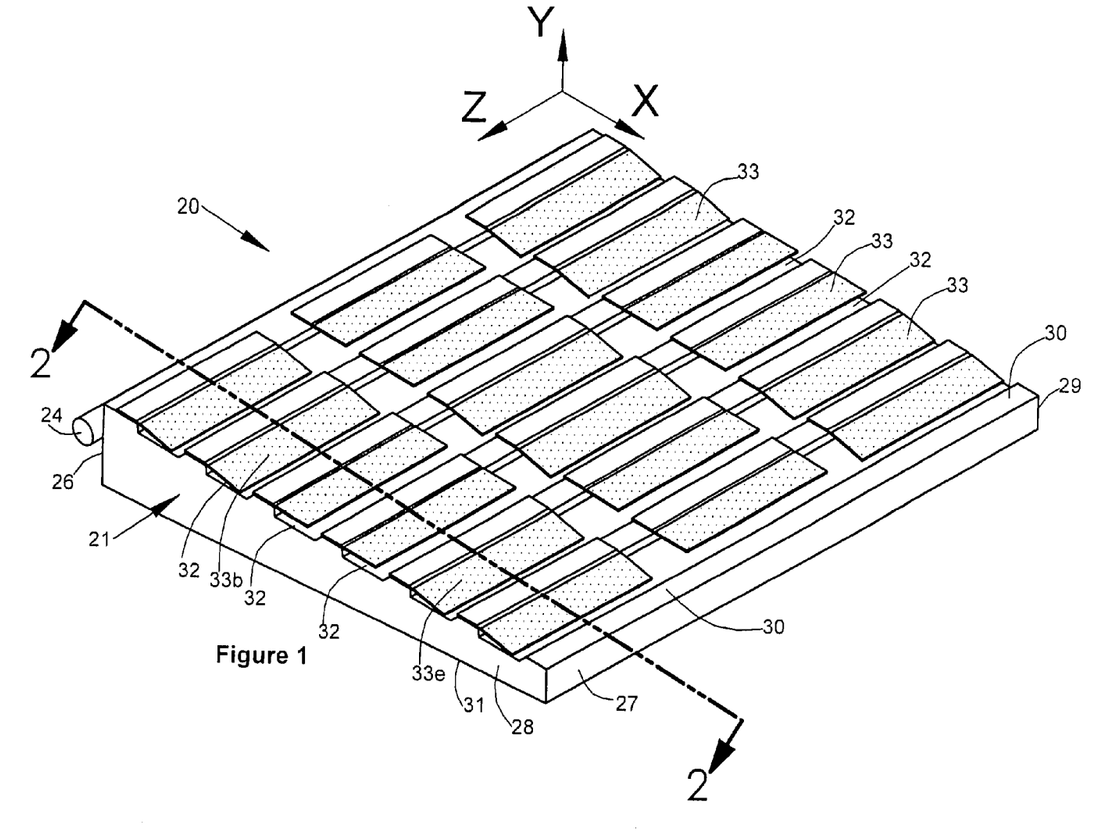
FIG. 1 is a perspective view of one form of the display panel of the present invention.
Figure 2:
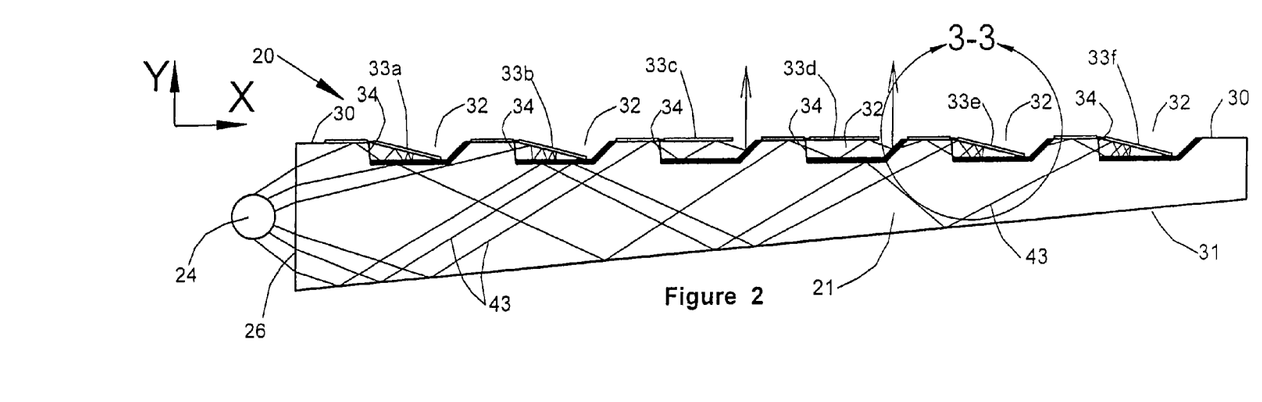
FIG. 2 is an enlarged cross-sectional view taken along lines 2-2 of FIG. 1.
Figure 3:
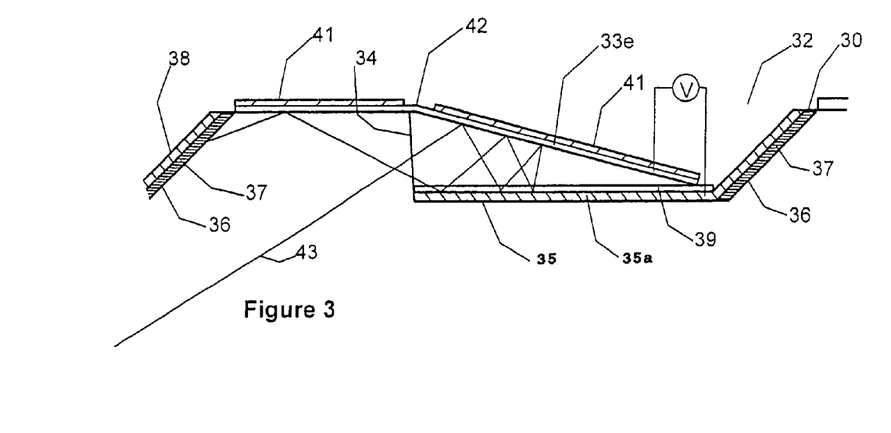
FIG. 3 is an enlarged, fragmentary, cross-sectional view of the area designated in FIG. 2 as 3-3.

Referring to the drawings and particularly to FIGS. 1 through 3, these drawings illustrate the construction and optical functionality of a display panel having an optical waveguide and tilting micro-mirrors of the character found in the embodiments of the invention that will be described in the paragraphs which follow. As best seen in FIG. 1, the display panel, which is generally designated by the numeral 20, includes a rectangular shaped optical waveguide 21 that is wedge-shaped in cross section. Waveguide 21 is preferably constructed from an optically transparent material, such as acrylic or glass and comprises parallel first and second end surfaces 26 and 27 that are joined by parallel side surfaces 28 and 29 (see FIG. 1). Waveguide 21 also includes a specially configured major upper surface 30 and an upwardly inclined lower surface 31 (see also FIG. 2). A plurality of equally spaced-apart grooves 32 are formed on upper surface 30 and, as shown in FIG. 1, extend between side surfaces 28 and 29. An elongated light source 24 is installed proximate the wide edge 26 of the waveguide 21 and a matrix of tilting micromirrors 33 is constructed on upper surface 30 of the waveguide in FIG. 2. Also in FIG. 2, one column of the tilting micro-mirrors is designated as 33a, 33b, 33c, 33d, 33e and 33f.

Referring next to FIG. 3 of the drawings, groove 32, which is representative of all of the grooves formed on the upper surface 30 of the waveguide 21, comprises three flat facets 34, 35 and 36. As illustrated in FIGS. 2 and 3, facets 34 are inclined downwardly at a steep angle of between 80 and 90 degrees with respect to the upper surface 30. Second facets 35 are recessed from and are parallel to the upper surface 30 and facets 36 are upwardly inclined at angles of between about 45 and about 60 degrees with respect to upper surface 30.

As further illustrated in FIG. 3, multi-layer film coatings are applied to facets 35 and 36. The first layer 37 is a light-absorbing black polymer film deposited only on facets 36. The second layer 38, which can be formed from a material such as an aluminum alloy, comprises a conductive specularly reflective mirror film that is deposited on facets 35 and on light-absorbing layer 37. The third layer 39 comprises a transparent electrical insulator that is deposited only on the flat horizontal sections of conductive mirror film layer 38.

FIG. 3 also illustrates one of the tilting micro-mirrors 33e of the group of tilting micro-mirrors 33. Each of the tilting micro-mirrors comprises a thin aluminum alloy elastic film that is affixed to the upper surface 30 of the waveguide 21. In order to bend the micro-mirror at the tilt axis 42 (see FIG. 3), the thickness of each of the micro-mirrors is reduced at the junction of the downwardly inclined facets 34 with the upper surface 30 of the waveguide 21. For absorbing external light, a thin black polymer film 41 is deposited on the upper surface of each micro-mirror.

In the present form of the display panel, the tilting micro-mirrors 33 operate by electrostatic attraction force and by the counter spring forces generated by the elastic film. Electrically, each tilting micro-mirror 33 represents a capacitor plate that forms a variable capacitor with the conductive mirror films 38. When a suitable voltage "V" is applied between the fixed conductive mirror films 38 and a micro-mirror 33, the micro-mirror tilts by electrostatic attraction force and, when no voltage is applied, the micro-mirror is returned to the flat position by the counter spring force of the elastic film. As an alternate to the grooves, appropriately configured cavities can be formed on the upper surface 30 of the waveguide and the tilting micro-mirrors can be received within the cavities rather than within the grooves.

As best seen in FIG. 2 of the drawings, light rays 43 entering from the wide edge 26 of the waveguide 21 are uniformly distributed in the light propagation direction of the X-axis by total internal reflections and exit the waveguide 21 from downwardly inclined facets 34. Depending on the positions of the tilting micro-mirrors, light rays are absorbed, or directed to the viewer.

When a tilting micro-mirror is in the flat position, such as micro mirrors 33c and 33d (FIG. 2), light rays reflect from the lower light reflecting surfaces of the micro-mirrors and mirror coatings 38 and are directed to the viewer. When a selected micro-mirror is tilted down, such as micro-mirrors 33a and 33b, light rays reflect from the lower light reflecting surface of the micro-mirror and mirror coatings 38 and change the angles towards the normal. After multiple reflections, light rays lose their energy and the light is absorbed. Some light rays may change their angles of reflection by reflecting from the micro-mirrors and mirror coatings 38 and such light rays re-enter the light guide from downwardly inclined facets 34 and travel backwards to the direction of the light source. (See micro-mirrors 33e and 33f as shown in FIGS. 2 and 3.) Light-absorbing layers 37 absorb light rays traveling backwards.

Depending on the display size and resolution, each picture element may include several tilting micro-mirrors. Reducing the size of individual micro-mirrors helps to reduce the required electrostatic actuation voltages. Also, micro-mirrors for each picture element may be grouped to modulate different levels of light when suitable voltage is applied between the fixed electrodes 35a and a selected group of micro-mirrors. This reduces the display addressing constraints. The display panel shown in FIG. 1 may be constructed on a separate substrate and combined with a backlight assembly. The present invention provides matrix addressing structures and methods for a display panel system of this type.

Figure 4:
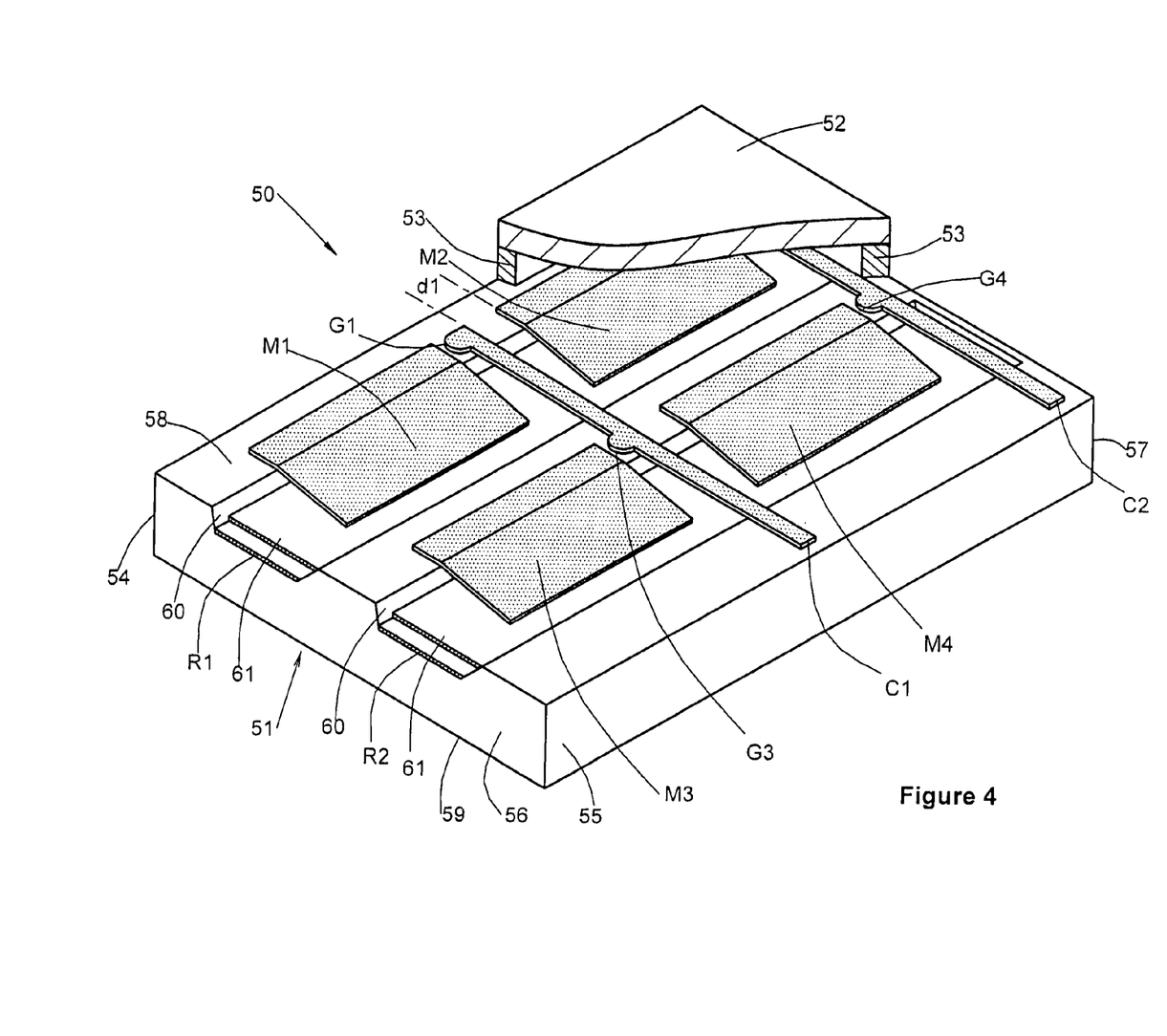
FIG. 4 is a perspective view partly broken away to show internal construction of a display panel that implements one form of addressing structures of the invention and carries out one form of the addressing methods of the present invention.

FIG. 4 shows a display panel 50, which implements one form of addressing structures of the invention, carrying out the addressing methods of the present invention. The display panel of the present invention typically includes significantly large numbers of picture elements and associated addressing electrodes. However, for illustration purposes only, four picture elements and two pairs of row and column electrodes are shown in FIG. 4 as first and second addressing electrodes for display panel 50.

As illustrated in FIG. 4, display panel 50 includes two parallel first and second substrates 51 and 52 that are constructed from an optically transparent material, such as acrylic or glass, and are spaced apart by spacers 53. In the present form of the invention, the space between the substrates 51 and 52 is substantially filled with a discharge gas such as neon, argon, helium and xenon or any mixture thereof at a pressure between approximately 30 torr and approximately 500 torr. These gases are used in plasma displays and many other electrical appliances and are called an ionazable gas or a discharge gas.

As shown in FIG. 4 of the drawings, substrate 51 is rectangular in shape and includes parallel first and second end surfaces 54 and 55 that are joined by parallel side surfaces 56 and 57. Substrate 51 also includes a specially configured major upper surface 58 and a spaced apart lower surface 59. Equally spaced-apart grooves 60 are formed on upper surface 58 and extend between the side surfaces 56 and 57. Provided on the recessed facets that are disposed within grooves 60 are first addressing or row electrodes R1 and R2. Row electrodes R1 and R2 are preferably deposited from nickel or aluminum and are insulated with thin layers of dielectric films 61.

Four tilting micro-minors M1, M2, M3 and M4 and second addressing or column electrodes C1 and C2, which are constructed from thin aluminum alloy elastic film, are affixed to the upper surface 58 of substrate 51. In the present form of the display panel of the invention, the tilting micro-mirrors M1, M2, M3 and M4 are movable between first and second positions and operate by electrostatic attraction force between the tilting micro-mirrors and the respective row electrodes R1 and R2 and by the counter spring forces generated by the elastic film. Electrically, each tilting micro-mirror represents a capacitor plate and forms, along with the row electrodes, a variable capacitor. Four arc gaps G1, G2, G3 and G4 are formed between the column electrodes and micro-mirrors. To prevent crosstalk, it is desirable to have minimum stray capacitance between the micro-mirrors and column electrodes. Therefore, only a portion of the column electrodes is extended closer to the micro-mirrors. For typical applications, the length of the arc gaps may range from a few micrometers to several hundred micrometers. As previously stated, the present invention uses low pressure gas discharge for addressing the micro-mirrors.

In operation, a minimum breakdown voltage Vb is required to initiate a spark between the column electrodes and the micro-mirrors. The required minimum breakdown voltage Vb generally follows Paschen's law, which states that the minimum breakdown voltage of a gap is the product of the gas pressure and the gap length. This is a non-linear function and is typically written as Vb=f(p*d), where p is the pressure and d is the gap distance. During operation, and to prevent arcing between column electrode C1 and micro-mirrors M2 or M4, the distance d1 between column electrode C1 and micro-mirrors M2 and M4 is made significantly larger than the length of the arc gaps.

Figure 5:
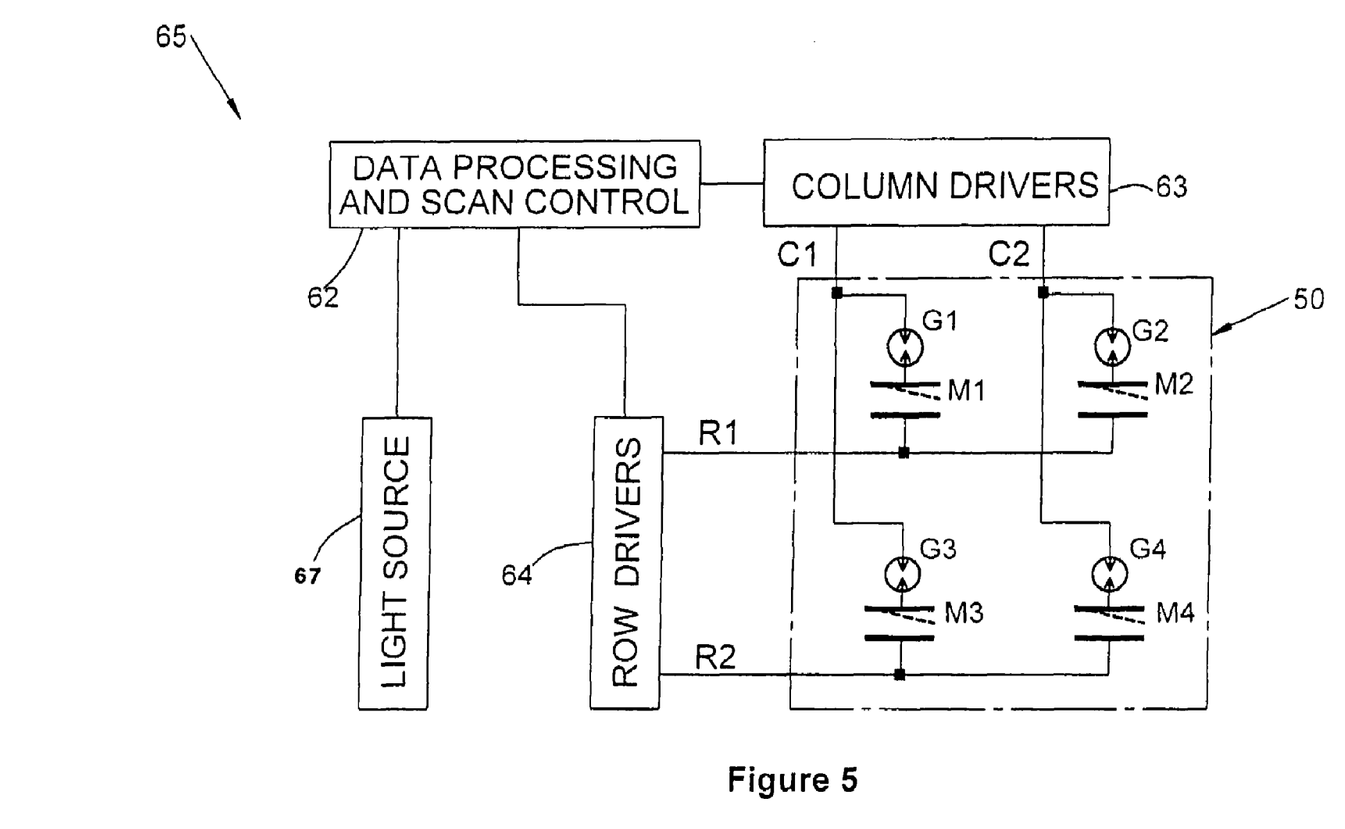
FIG. 5 is a schematic view of a flat panel display of the invention that includes a display panel and associated panel drive electronics.

FIG. 5 illustrates a schematic diagram of a flat panel display 65 that includes display panel 50 and panel drive electronics. As depicted in FIG. 5, data processing and display scanning electronics block 62 provides scanning signals to the row drivers 64 for sequentially selecting row electrodes of display panel 50 and provides synchronized data signals to column drivers 63. Block 62 also provides a synchronized control signal to the light source 67. Row drivers 64 and column drivers 63 include shift registers and buffer amplifiers for driving the electrodes of display panel 50. Typical buffer amplifiers include complimentary transistors and reverse biased protection diodes.

In FIG. 5, the tilting micro-mirrors of display panel 50, which form capacitors with the respective portions of the row electrodes, are illustrated as capacitor plates M1, M2, M3 and M4. Also shown in FIG. 5 are four arc gaps G1, G2, G3 and G4, each having a first terminal connected to the respective column electrodes C1 and C2, and a second terminal connected to the respective capacitor plates M1, M2, M3 and M4.

Figure 6:
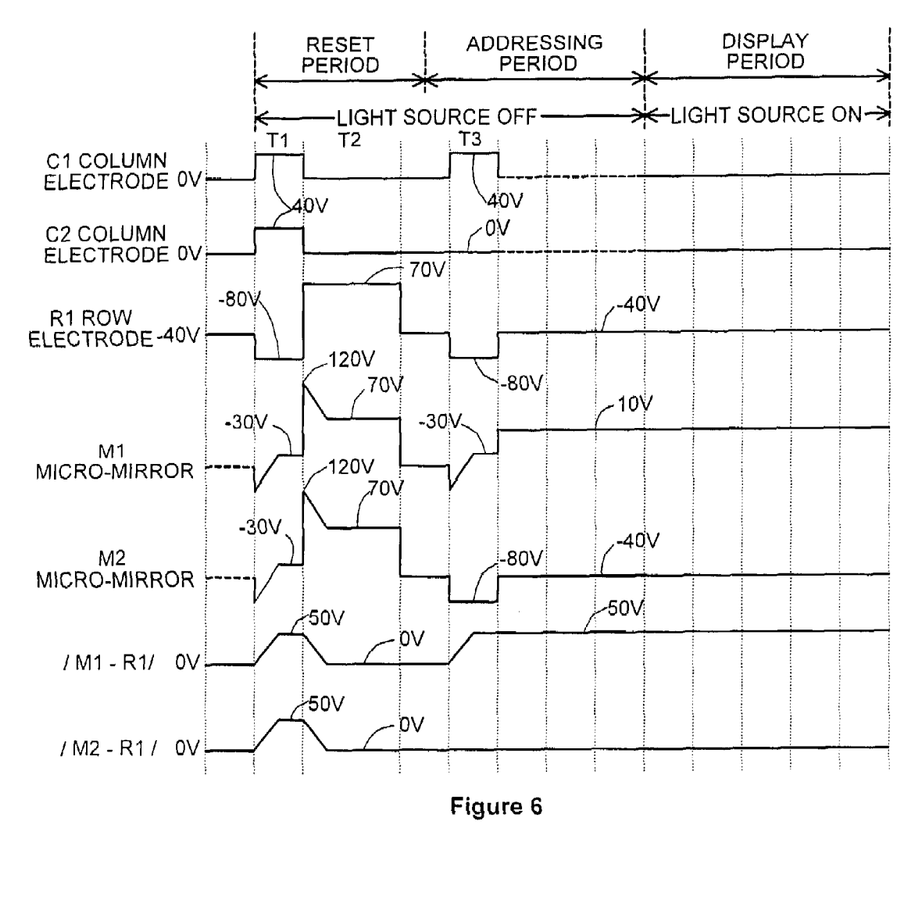
FIG. 6 is a schematic view illustrating the various voltage waveforms that are applied to the row and column electrodes of the invention for addressing the display panel.

FIG. 6 illustrates the various voltage waveforms that are applied to the row and column electrodes for addressing display panel 50. Additionally, FIG. 6 illustrates the voltage waveforms for micro-mirrors M1 and M2 that are generated as consequence of voltages applied to the column and the row electrodes. In FIG. 6 one video field time interval is shown that comprises reset, addressing and display periods. Initially, the column electrodes are set to 0V potential and the row electrodes to −40V potential. Initially the capacitors formed by the micro-mirrors and the row electrodes are discharged so that the micro-mirrors M1 and M2 have the same −40V potential as the row electrodes.

As previously discussed, a specific minimum gas breakdown voltage Vb is required across the arc gap to initiate arc. Each gas discharge also has a specific extinguishing voltage Ve which is approximately 70% of breakdown voltage Vb. For this application assume that the breakdown voltage Vb=100V and the extinguishing voltage Ve=70V.

During the time interval T1, which is 1 microsecond or less, a 40V pulse is applied to the column electrodes C1 and C2, and −80V is applied to the row electrode R1. This generates 120V potential across the arc gaps G1 and G2 and initiates an arc at each arc gap. The initiated arcs charge the capacitors formed by the micro-mirrors M1 and M2 and respective portions of the row electrode R1. The charges applied to the micro-mirrors M1 and M2 raise the voltage potential of the micro-mirrors up to 50V. Consequently, the voltage potential drops below the extinguishing voltage Ve=70V across the arc gaps and the arcs extinguish. The equivalent circuits operate as a voltage controlled self-terminating current switch.

During the time interval T2, the voltage on the column electrodes C1 and C2 is set to 0V and the row electrode R1 is raised to 70V potential. This adds to the 50V charge applied to the micro-mirrors M1 and M2 during the T1 time interval and generates 120V potential across the arc gaps G1 and G2, initiating an arc at each arc gap. The initiated arcs discharge the capacitors formed by the micro-mirrors M1 and M2 and respective portions of the row electrode R1. This reduces the voltage potential across the arc gaps from 120V to 70V and arcs extinguish.

In FIG. 6, the last two waveforms illustrate the voltage potential differences that generate electrostatic attraction force between the micro-mirrors M1 and M2 and the row electrode R1. During the time interval T2, the previously actuated micro-mirrors reset to the upper flat position by the counter spring force generated by the elastic films. For this reason the T2 time interval is held sufficiently long (>20 microseconds). The described operations for the time intervals T1 and T2 apply to all micro-mirrors and row electrodes of the display.

As shown in FIG. 6, during the addressing period and the time interval T3, 40V is applied to the column electrode C1, 0V to the column electrode C2 and −80V to the row electrode R1. This generates 120V potential across the arc gap G1 and 80V potential across the arc gap G2. As the required breakdown voltage is Vb=100V, arc initiates only at the arc gap G1 and the initiated arc charges the micro-mirror M1 by 50V. Micro-mirrors actuate by the electrostatic force generated between the row electrodes and the micro-mirrors that receive 50V charge. Following the time interval T3, the addressing of the micro-mirrors M3 and M4 is performed by applying a −80V pulse to the row electrode R2 and corresponding data to the column electrodes.

Figure 7:
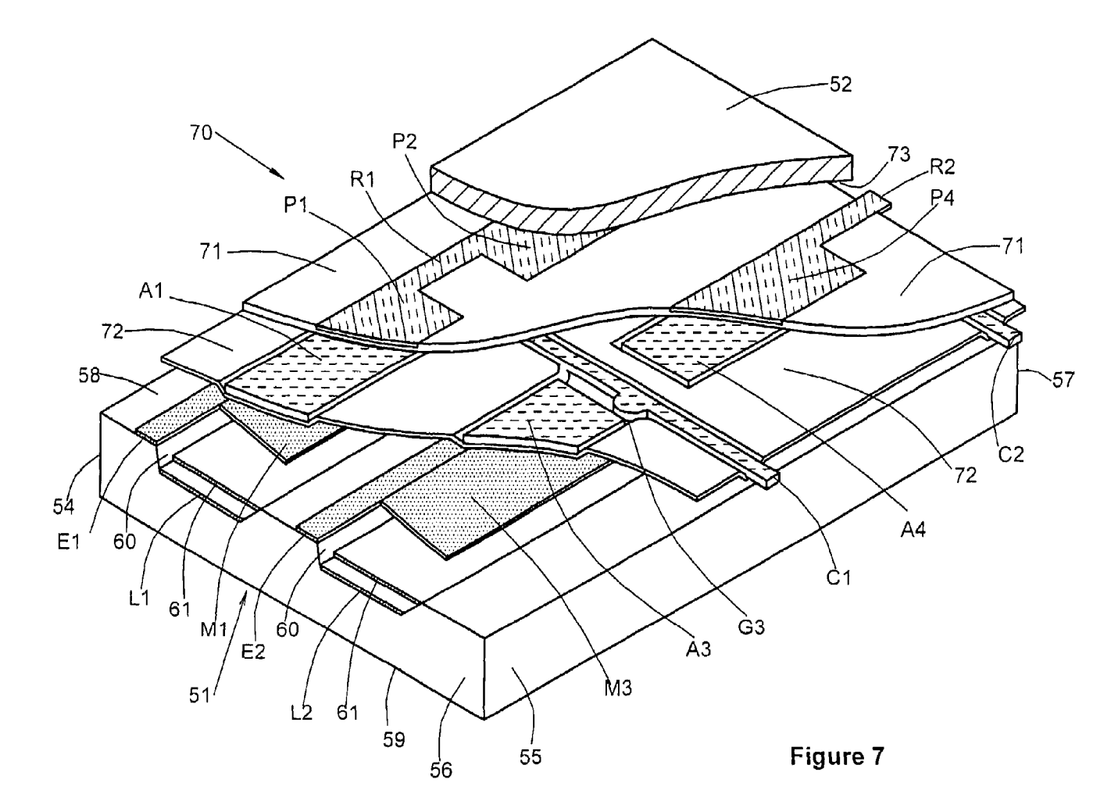
FIG. 7 is a perspective view, partly broken way to show internal construction, of an alternate form of the display panel of the invention.

Referring to FIG. 7, an alternate form of display panel of the invention is there shown and designated by the numeral 70. This alternate embodiment, which implements the addressing structures and carries out the addressing methods of the present invention, is similar in some respects to the embodiment shown in FIG. 4 of the drawings and like numbers are used in FIG. 7 to identify like components.

Display panel 70 here includes two spaced apart, parallel substrates 51 and 52 that are constructed from an optically transparent material, such as acrylic or glass. In the display panel 70 the addressing structures are built on the front cover substrate 52 and the micro-mirrors and the lower electrostatic actuation electrodes are built on the substrate 51. The substrate 51 is rectangular shaped and comprises parallel first and second end surfaces 54 and 55 that are joined by parallel side surfaces 56 and 57. Substrate 51 also includes a specially configured major upper surface 58 and spaced apart lower surface 59.

Equally spaced-apart grooves 60 are formed on upper surface 58 and extend between the side surfaces 56 and 57. Lower electrodes L1 and L2, are carried on the recessed facets that are disposed within grooves 60 and are deposited from aluminum and insulated with thin transparent dielectric films 61. Four tilting micro-mirrors M1, M2, M3 and M4 and first and second micro-mirror drive electrodes E1 and E2, which are constructed from thin aluminum film, are affixed to the upper surface 58 of substrate 51. Electrode E1 is electrically connected to the micro-mirrors M1 and M2 and electrode E2 is electrically connected to micro-mirrors M3 and M4. First addressing or row electrodes R1 and R2, which include a rectangle shaped capacitor plates P1, P2, P3 and P4, are carried on the lower surface 73 of the substrate 52 and are deposited from aluminum. As shown in FIG. 7, capacitor plates P1, P2, P3 and P4 are positioned above the respective micro-mirrors.

Row electrode R1 is electrically connected to capacitor plates P1 and P2 while the row electrode R2 is electrically connected to capacitor plates P3 and P4. A thin transparent insulator 71 is spin coated on row addressing electrodes and capacitor plates P1, P2, P3 and P4. Four rectangular shaped picture element electrodes A1, A2, A3 and A4, and two second addressing or column electrodes C1 and C2, which are constructed from aluminum film, are affixed to the lower surface of the insulator 71. Portions of the column electrodes extend closer to the picture element electrodes forming the arc gaps G1, G2, G3 and G4. A thin transparent insulator film 72 is placed on the lower surface of picture element electrodes and the space between the insulator films 71 and 72 is filled with a discharge gas at low pressure. This process, which is similar to vacuum forming, deforms the insulator film 72 and creates pockets for discharge gas at each arc gap between the picture element electrodes and the column electrodes.

In the display panel 70 picture elements represent a three electrode electrostatic actuators. Micro-mirrors M1, M2, M3 and M4 are moving electrodes that are positioned between the respective upper picture element electrodes A1, A2, A3 and A4 and the lower electrodes L1 and L2. The electrostatic attraction force between the picture element electrodes and the micro-mirrors move the micro-mirrors to the first upper flat position and the electrostatic attraction force between the micro-mirrors and the lower electrodes tilt the micro-mirrors in a downward direction toward a second position.

Figure 8:
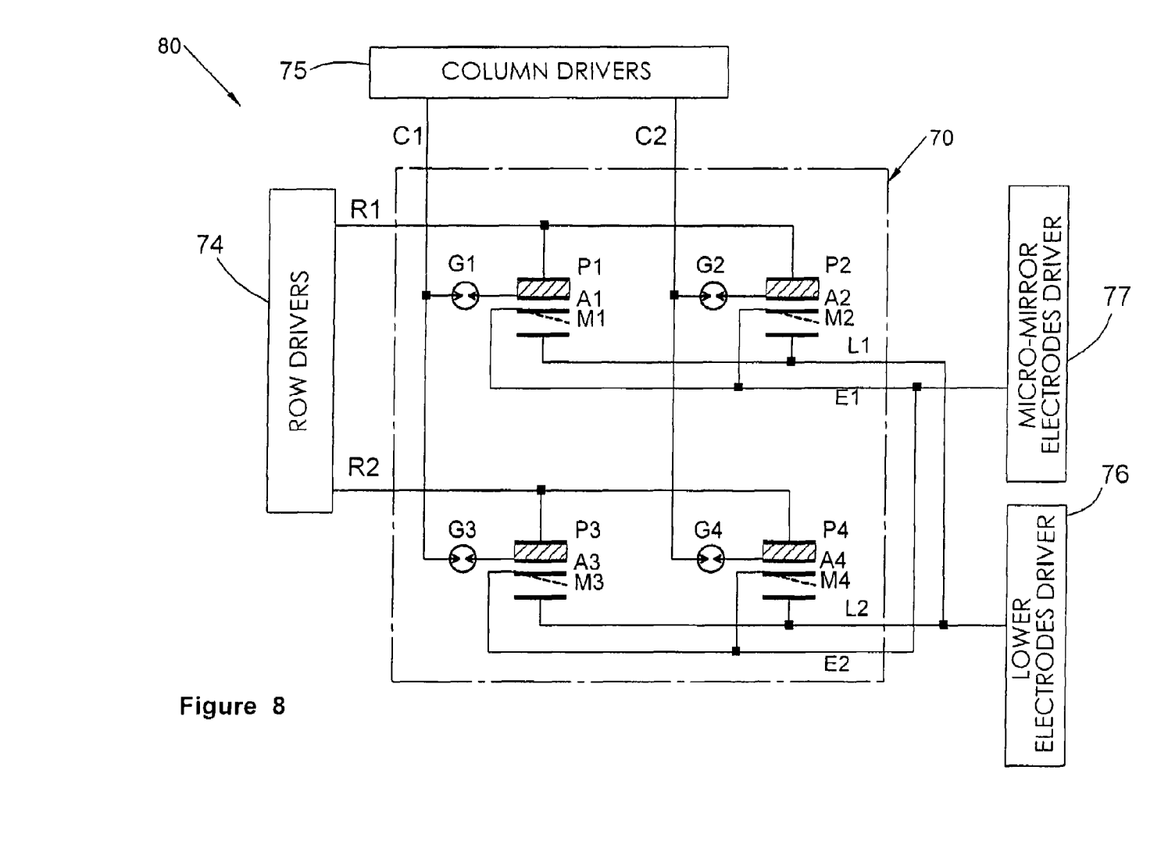
FIG. 8 a schematic view of an alternate form of flat panel display of the invention that includes the display panel and the panel drive electronics of the display.

FIG. 8 illustrates a schematic diagram of a flat panel display 80 that includes the display panel 70 and the panel drive electronics of the invention. The panel drive electronics here includes a block 74 for sequentially driving row electrodes R1 and R2 of the display panel 70, a block 75 for providing synchronized data to the column electrodes C1 and C2, a block 76 for supplying voltage to the lower electrodes L1 and L2; and a block 77 for driving electrodes E1 and E2 of the display panel 70. In the display panel 70 each picture element represents three capacitors connected in series. The first capacitors are formed by the picture element electrodes A1, A2, A3 and A4 and the capacitor plates P1, P2, P3 and P4 which are connected to the respective row electrodes R1 and R2. The second capacitors are formed by the picture element electrodes A1, A2, A3 and A4 and the micro-mirrors M1, M2, M3 and M4 which are connected to respective drive electrodes E1 and E2. The micro-mirrors M1, M2, M3 and M4, and the respective portions of the lower electrodes L1 and L2 form the third capacitors. Four arc gaps G1, G2, G3 and G4 are provided in the display panel 70 with each having the first terminal connected to the respective column electrodes C1 and C2, and a second terminal connected to the respective picture element electrodes A1, A2, A3 and A4.

Figure 9:
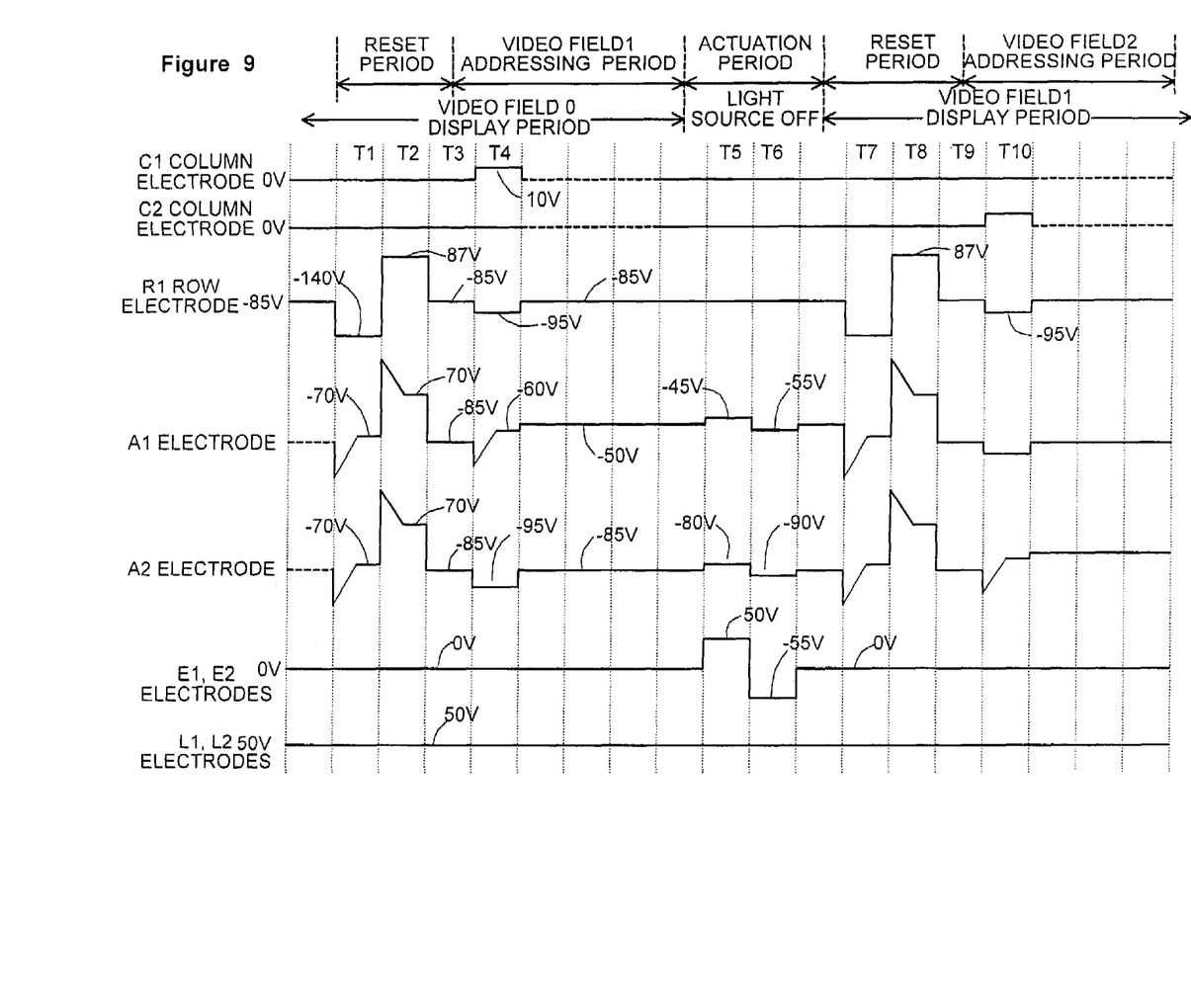
FIG. 9 is a schematic view illustrating the voltage waveforms that are applied to the row and column electrodes for addressing the display panel illustrated in FIG. 7.

FIG. 9 illustrates the voltage waveforms that are applied to the row and column electrodes for addressing the display panel 70. FIG. 9 also illustrates the voltage waveforms for A1 and A2 picture element electrodes that are generated as a consequence of the voltages applied to the row electrode R1 and column electrodes C1 and C2. The last two waveforms illustrated in FIG. 9 show electrostatic actuation voltages supplied to the electrodes L1, L2, E1 and E2.

As previously discussed, the picture element electrodes form capacitors with the row electrodes and the micro-mirrors. For the present application assume that the capacitors formed with the picture element electrodes A1 and A2 and the row electrode R1 have 10 times greater value than the capacitors formed with the picture element electrodes A1 and A2 and the micro-mirrors M1 and M2. The voltage values shown in FIG. 9 account these 10 to 1 capacitive dividers.

As illustrated in FIG. 9, wherein two video field time intervals are shown, it can be seen that display panel 70 is capable of simultaneous addressing and display operations. The display period of video field 0 coincides with addressing period of video field 1 while the display period of video field 1 coincides with addressing period of video field 2.

Before a video field addressing period all picture element electrodes are reset to approximately the voltage potential of the row electrodes. Similarly, during each actuation period and before a video field display period, all micro-mirrors are reset to their new positions. Additionally, during the actuation periods the light source is turned off and during the display periods the light source is turned on.

Initially the column electrodes are set to 0V potential and the row electrodes are set to −85V potential. For this application once again assume that the breakdown voltage of the discharge gas is Vb=100V and the extinguishing voltage is Ve=70V.

During the time interval T1, which is 1 microsecond or less, 0V is applied to the column electrodes C1 and C2 and about −140V is applied to the row electrode R1. This generates a voltage potential across the arc gaps G1 and G2 that is greater than the breakdown voltage Vb=100V, thereby initiating an arc at each arc gap. The initiated arcs charge the picture element electrodes A1 and A2 and raise the voltage potential of the picture element electrodes to about 70V.

Consequently, the voltage potential drops below the extinguishing voltage Ve=70V across the arc gaps and the arcs extinguish. During the time interval T2, the voltage on the row electrode R1 is raised to about 87V potential. This raises and adds to the 70V charge applied to the picture element electrodes during the T1 time interval and initiates an arc at arc gaps G1 and G2. The initiated arcs discharge the picture element electrodes A1 and A2. Consequently, the voltages drop across the arc gaps to about 70V and the arcs extinguish.

During the time interval T3, the voltage applied to the row electrode R1 is reduced to about −85V, setting a voltage potential of approximately −85V on the picture element electrodes A1 and A2. It is to be understood that the previously described operations for the time intervals T1 and T2 apply to all row and picture element electrodes of the display panel 70.

During the addressing period of video field 1 and time interval T4, about 10V is applied to the column electrode C1, 0V to the column electrode C2, and −95V to the row electrode R1. This generates a 105V potential across the arc gap G1 and a 95V potential across the arc gap G2. Because the required breakdown voltage is Vb=100V, arc is initiated only at arc gap G1. The initiated arc at arc gap G1 charges the picture element electrode A1 by about 35V. Following the time interval T3, a −95V pulse is applied to the row electrode R2 and corresponding data is applied to the column electrodes.

During the reset and addressing periods, 0V is applied to electrodes E1 and E2 and about 50V to electrodes L1 and L2. The 50V potential between each tilted micro-mirror and the lower electrode supply a bias force that holds the micro-mirrors in tilted position. Similarly for micro-mirrors in the upper flat position, 50V or 85V potential between each micro-mirror and respective picture element electrodes supply a bias force that holds the micro-mirrors in the upper flat position.

Resetting the micro-mirrors to their new positions is a two step process. First, the tilted micro-mirrors move to the upper flat position, and then the micro-mirrors selectively tilt according to new addressing.

During the actuation period and time interval T5, about 50V is applied to the electrodes E1, E2, L1 and L2. These generate an electrostatic attraction force between each micromirror and respective picture element electrode. The generated forces move the previously tilted micro-mirrors to the upper flat position. Now all micro-mirrors are at the upper flat position and closer to the picture element electrodes. During the time interval T6, the voltage potential of electrodes E1 and E2 is lowered to about −55V. This generates approximately 105V potential between the lower electrode L1 and micro-mirrors M1 and M2, and 0V between the picture element electrode A1 and the micro-mirror M1. The electrostatic force between micro-mirror M1 and lower electrode L1 causes the micro-mirror M1 to tilt. The approximate 35V potential between the micro-mirror M2 and the picture element electrode A2 supplies a bias force between the micro-mirror M2 and the picture element electrode A2, holding the micro-mirror M2 at the upper flat position.

While the embodiments of the present invention were described for tilting micro-mirrors, it is to be understood that there are several other micro-mechanical light modulators for which the teachings of the present invention are applicable.

Having now described the invention in detail in accordance with the requirements of the patent statutes, those skilled in this art will have no difficulty in making changes and modifications in the individual parts or their relative assembly in order to meet specific requirement or conditions. Such changes and modification may be made without departing from the scope and spirit of the invention, as set forth in the following claims.

We claim:

1. A display comprising:
   (a) a plurality of picture elements each including a moving electrode for modulating light;
   (b) a plurality of first and second addressing electrodes for selectively addressing said plurality of picture elements;
   (c) a plurality of picture element electrodes, associated with the plurality of picture elements, for providing a selective electrostatic force to said moving electrodes via a gas discharge space formed between each of the plurality of picture element electrodes and the plurality of second addressing electrodes;
   (d) an ionizable gas in physical contact with said second addressing electrodes and said picture element electrodes, and
   (e) an electronic circuitry connected to said first and second addressing electrodes for selectively ionizing said ionizable gas and initiating an electrical conduction path in said gas discharge space between said second addressing electrodes and said picture element electrodes.

2. The display according to claim 1 wherein said ionizable gas is physically isolated from said moving electrodes, said first addressing electrodes and portions of said picture element electrodes and said second addressing electrodes.

3. The display according to claim 1 wherein said first and second addressing electrodes, said moving electrodes and said picture element electrodes are formed from a light reflecting conductor.

4. The display according to claim 1 wherein said moving electrodes are formed from an electricity conductor having a light absorbing first surface and light reflecting second surface.

5. The display according to claim 1 wherein said picture elements are arranged in a matrix form.

6. The display according to claim 1 wherein said picture elements are arranged in a matrix form and wherein each said first addressing electrode is coupled with a row of said picture elements and each said second addressing electrode is coupled with a column of said picture elements.

7. The display according to claim 1 wherein said first addressing electrodes are disposed orthogonal to said second addressing electrodes.

8. The display according to claim 1 in which said electronic circuitry further connected to each of said moving electrodes for supplying a first voltage potential to each said moving electrodes for moving each of said moving electrodes from a first position to a second position, supplying a second voltage potential for selectively displacing each of the moving electrodes from said second position to said first position and supplying a third voltage potential to retain each of the moving electrodes at one of said first and second positions.

9. The display according to claim 1 further including means for supplying an electrostatic force to each said moving electrodes for moving each of said moving electrodes from a first position to a second position, supplying said electrostatic force for selectively displacing each of the moving electrodes from said second position to said first position and supplying a bias electrostatic force for retaining each of the moving electrodes at one of said first and second positions.

10. The display according to claim 1 wherein said ionizable gas comprises at least one of helium, neon, argon or xenon.

11. The display according to claim 1 wherein said ionizable gas has a pressure between 30 torr and 500 torr.

12. The display according to claim 1 further including a fixed electrode and each said moving electrode is located between a selected one of said picture element electrodes and said fixed electrode.

13. The display according to claim 1 further including an optical waveguide having an upper surface, a plurality of light exit facets extending downwardly from said upper surface and a plurality of recessed facets interleaved with said light exit facets, and a fixed electrode formed on said recessed facets and connected to a first power supply, wherein said moving electrodes modulate the light exiting from said light exit facets of said optical waveguide.

14. The display according to claim 1 further including an optical waveguide having an upper surface, a plurality of light exit facets extending downwardly from said upper surface and a plurality of recessed facets interleaved with said light exit facets, wherein said first addressing electrodes are formed on said recessed facets, and wherein said moving electrodes modulate the light exiting from said light exit facets of said optical waveguide.

15. The display according to claim 1 further including an optical waveguide having an upper surface and a plurality of light exit facets extending downwardly from said upper surface, wherein said moving electrodes modulate the light exiting from said light exit facets of said optical waveguide.

16. The display according to claim 1 further including means for supplying a bias electrostatic force to each of said moving electrodes to retain said moving electrodes at one of a first and a second position during a video field addressing period.

17. The display according to claim 1 wherein said first addressing electrodes provide an electrostatic force to said moving electrodes via said picture element electrodes.

18. The display according to claim 1 wherein said electronic circuitry provides a first polarity voltage potential followed by an opposite polarity voltage potential between said first and second addressing electrodes for resetting the first polarity voltage potential of said picture element electrodes.

19. The display according to claim 1 further including an electrical insulator layer formed on said first addressing electrodes and wherein said plurality of picture element electrodes and said plurality of second addressing electrodes are formed on said electrical insulator layer.

20. The display according to claim 1 further including an electrical insulator layer formed on said first addressing electrodes and wherein said plurality of picture element electrodes are formed on said electrical insulator layer.

21. The display according to claim 1 further including a plurality of capacitor plates each connected to a selected one of said first addressing electrodes.

\* \* \* \* \*